United States Patent
Park

(10) Patent No.: US 11,579,787 B2
(45) Date of Patent: Feb. 14, 2023

(54) EXTENDED SUPER MEMORY BLOCKS IN MEMORY SYSTEMS

(71) Applicant: SK hynix Inc., Gyeonggi-do (KR)

(72) Inventor: Youn Won Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 20 days.

(21) Appl. No.: 17/383,154

(22) Filed: Jul. 22, 2021

(65) Prior Publication Data

US 2022/0300156 A1    Sep. 22, 2022

(30) Foreign Application Priority Data

Mar. 18, 2021    (KR) .......................... 10-2021-0035211

(51) Int. Cl.
*G06F 3/06* (2006.01)

(52) U.S. Cl.
CPC ............ *G06F 3/064* (2013.01); *G06F 3/0614* (2013.01); *G06F 3/0631* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 10,366,761 B2 * | 7/2019 | Kim | G06F 3/0604 |
| 10,366,776 B2 * | 7/2019 | Oh | G11C 29/42 |
| 2012/0203958 A1 * | 8/2012 | Jones | G06F 12/0246 |
| | | | 711/E12.008 |
| 2017/0147246 A1 * | 5/2017 | Byun | G06F 3/061 |
| 2018/0349243 A1 * | 12/2018 | Shin | G06F 12/0868 |
| 2019/0294335 A1 * | 9/2019 | Kim | G06F 3/0604 |

FOREIGN PATENT DOCUMENTS

| | | |
|---|---|---|
| KR | 10-2020-0001310 A | 1/2020 |
| KR | 10-2020-0055281 A | 5/2020 |
| KR | 10-2020-0132171 A | 11/2020 |

\* cited by examiner

*Primary Examiner* — William E. Baughman
(74) *Attorney, Agent, or Firm* — IP & T Group LLP

(57) ABSTRACT

Embodiments of the present disclosure relate to a memory system and an operating method of the memory system. According to embodiments of the present disclosure, a memory system may divide and manage the plurality of memory dies into a plurality of memory die groups, may set a first super memory block including at least one of memory blocks included in a first memory die group, and a second super memory block including at least one of memory blocks included in a second memory die group, may determine whether to set an extended super memory block in which all or part of the first super memory block and all or part of the second super memory block are merged, and may write a write data to the extended super memory block in an interleaving manner when writing the write data requested by a host.

15 Claims, 19 Drawing Sheets

EXTENDED SUPER MEMORY BLOCKS IN MEMORY SYSTEMS

CROSS-REFERENCE TO RELATED APPLICATION

The present application claims priority under 35 U.S.C. 119(a) to Korean patent application number 10-2021-0035211 filed on Mar. 18, 2021, which is incorporated herein by reference in its entirety.

TECHNICAL FIELD

The embodiments of the present disclosure relate to a memory system and an operating method of the memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

Furthermore, a memory device may include a plurality of memory dies, and each of the plurality of memory dies may include a plurality of memory blocks.

SUMMARY

Embodiments of the present disclosure may provide a memory system and an operating method of the memory system capable of optimizing a write performance according to the pattern of a write data received from a host.

In one aspect, embodiments of the present disclosure may provide a memory system including a memory device comprising a plurality of memory dies, wherein each memory die includes a plurality of memory blocks, and a memory controller which communicates with the memory device and controls the memory device.

The memory controller may divide and manage the plurality of memory dies into a plurality of memory die groups.

The memory controller may set a first super memory block which is a super memory block including at least one of memory blocks included in memory dies included in a first memory die group among the plurality of memory die groups, and a second super memory block which is a super memory block including at least one of memory blocks included in memory dies included in a second memory die group among the plurality of memory die groups.

The memory controller may determine whether to set an extended super memory block in which all or part of the memory blocks of the first super memory block and all or part of the memory blocks of the second super memory block are merged.

The memory controller may write a write data to the extended super memory block in an interleaving manner when writing the write data requested by a host to the extended super memory block.

In another aspect, embodiments of the present disclosure may provide an operating method of a memory system including a memory device including a plurality of memory dies, wherein each memory die includes a plurality of memory blocks.

The operating method of the memory system may include grouping the plurality of memory dies into a plurality of memory die groups.

The operating method of the memory system may include setting a first super memory block which is a super memory block including at least one of memory blocks included in memory dies included in a first memory die group among the plurality of memory die groups, and a second super memory block which is a super memory block including at least one of memory blocks included in memory dies included in a second memory die group among the plurality of memory die groups.

The operating method of the memory system may include determining whether to set an extended super memory block in which all or part of the memory blocks of the first super memory block and all or part of the memory blocks of the second super memory block are merged.

The operating method of the memory system may include writing a write data to the extended super memory block in an interleaving manner when writing the write data requested by a host to the extended super memory block.

In another aspect, embodiments of the present disclosure may provide a memory system including a memory device comprising a plurality of memory dies, wherein each memory die includes a plurality of memory blocks, and a memory controller which communicates with the memory device and controls the memory device.

The memory controller may set a first super memory block and second super memory block, which are two super memory blocks each including one or more of memory blocks included in the plurality of memory dies.

The memory controller may determine whether to set an extended super memory block in which all or part of the memory blocks of the first super memory block and all or part of the memory blocks of the second super memory block are merged.

The memory controller may write a write data to the extended super memory block in an interleaving manner when writing the write data requested by a host to the extended super memory block.

In another aspect, embodiment of the present disclosure may provide a memory system including a memory device including first and second groups of memory dies, the first and second groups respectively including first and second super blocks each including plural memory blocks selected from different memory dies and a controller configured to configure, in response to plural write requests, a third super block with the memory blocks from the first and second super blocks to control the memory device to store data into the third super blocks in an interleaving scheme.

The number of the write requests provided within a time amount may be greater than a threshold.

The amount of the data provided together with the write requests provided within a time amount may be greater than a threshold.

The controller may configure the third super block by adjusting, according to a write performance requirement level, a number of memory blocks to be included in the third super block.

The controller may determine the write performance requirement level based on a data amount stored into the memory device within a time amount.

According to embodiments of the present disclosure, it is possible to optimize a write performance according to the pattern of a write data received from a host.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
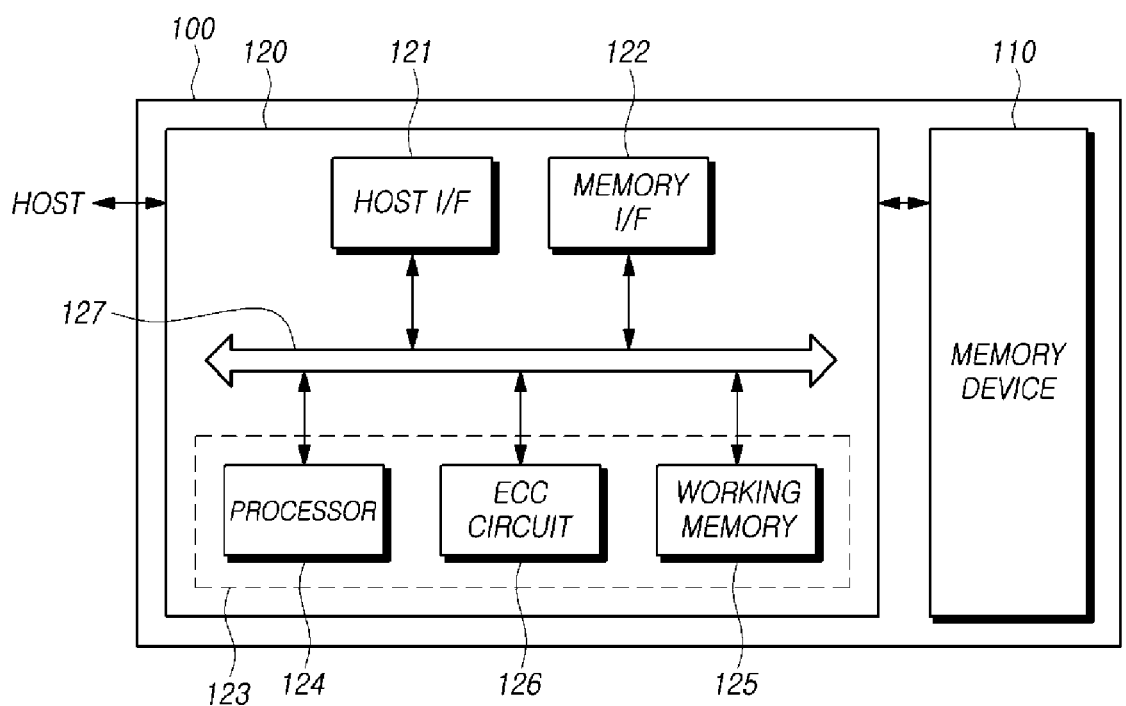
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operations may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100.

The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all of the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of the constituent elements illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
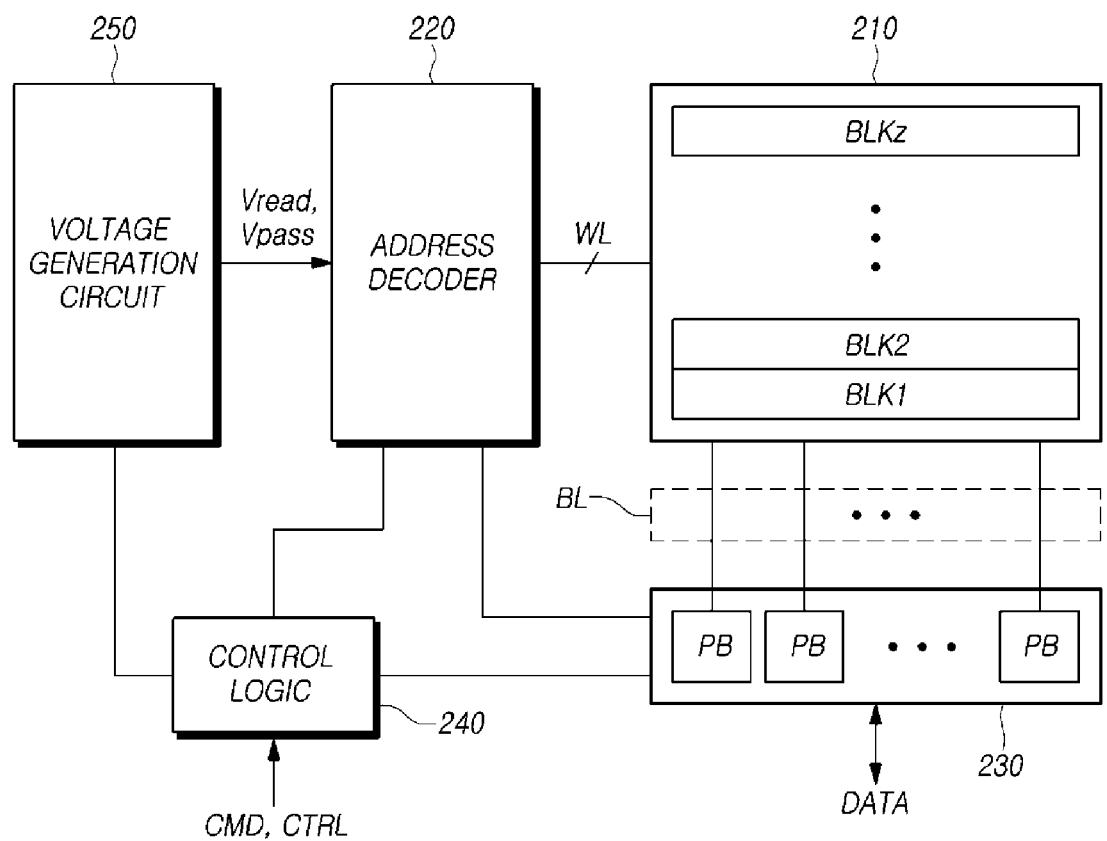
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
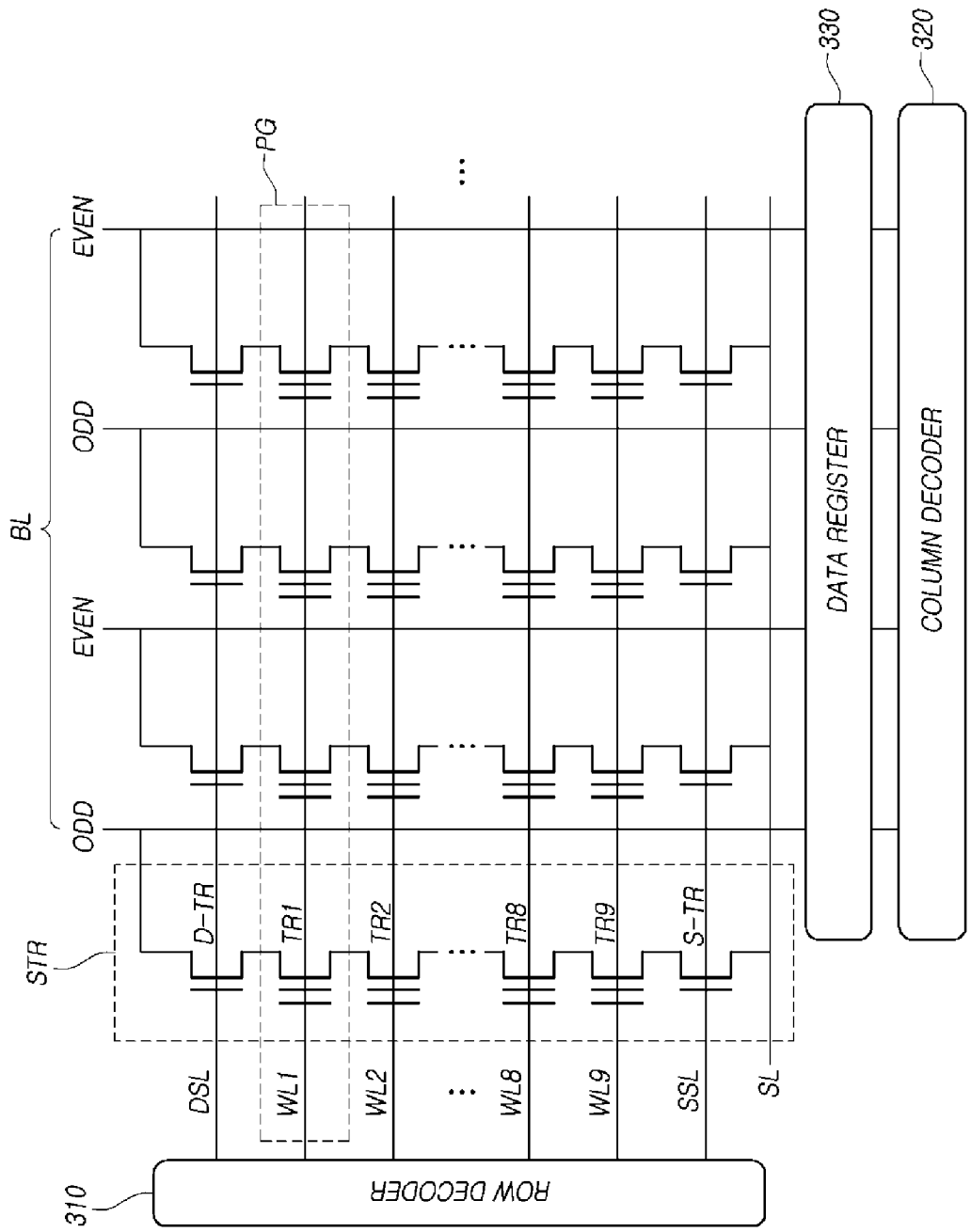
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
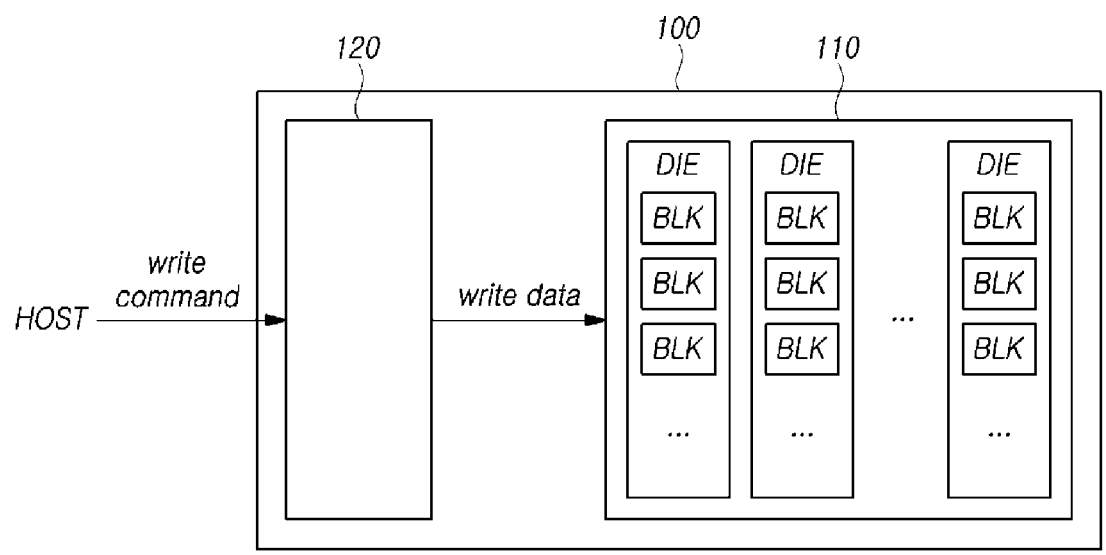
FIG. 4 illustrates a structure of a memory system according to embodiments of the present disclosure.

FIG. 4 illustrates a structure of a memory system 100 according to embodiments of the present disclosure.

Referring to FIG. 4, a memory device 110 of the memory system 100 may include a plurality of memory dies DIE. In addition, each of the plurality of memory dies DIE may include a plurality of memory blocks BLK.

Each of the plurality of memory dies DIE may operate independently. Among the plurality of memory dies DIE, a read/write operation for one memory die and a read/write operation for another memory die may be executed simultaneously and in parallel.

Further, each of the plurality of memory dies DIE may correspond to one channel (not shown). The channel is a path through which data is input/output to the memory die, and each of the plurality of memory dies DIE may input or output data necessary for a read/write operation through a corresponding channel. The read performance of the memory system 100 may be determined according to the number of channels, and the write performance of the memory system 100 may be determined according to the number of memory dies that can operate simultaneously and in parallel.

In addition, a memory controller 120 of the memory system 100 may receive a write request from a host through a write command and store the write data requested by the host in the memory device 110.

Hereinafter, an embodiment in which the memory system 100 manages a plurality of memory dies DIE included in the memory device 110 will be described.

In embodiments of the present disclosure, the memory controller 120 of the memory system 100 may group and manage a plurality of memory dies DIE included in the memory device 110 into a plurality of memory die groups.

Hereinafter, an example in which the memory controller 120 manages a first memory die group DGRP_1 and a second memory die group DGRP_2 among a plurality of memory die groups will be described. However, the memory controller 120 may group a plurality of memory dies into two or more memory die groups. In this case, each of the first memory die group DGRP_1 and the second memory die group DGRP_2 may be one of two or more memory die groups.

Figure 5:
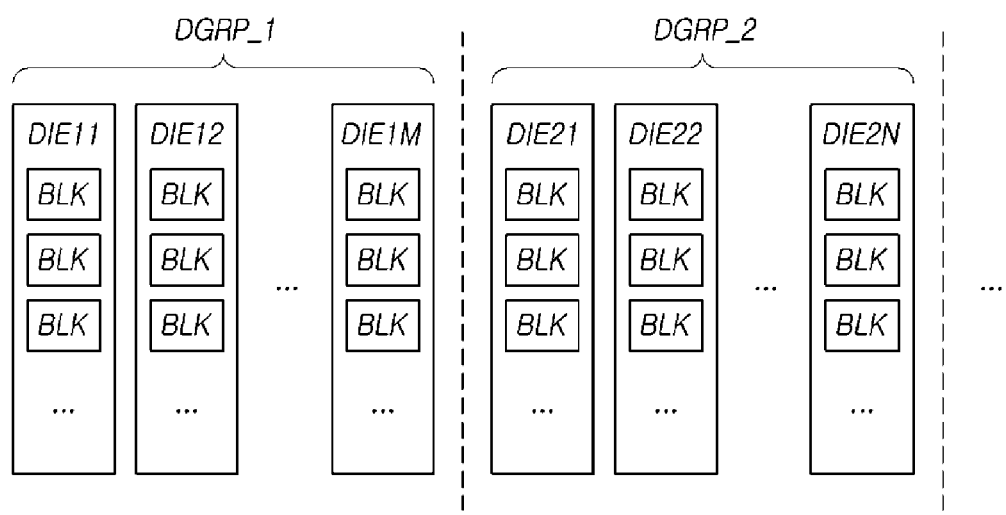
FIG. 5 illustrates an example in which a memory system divides a plurality of memory dies into a plurality of memory die groups according to embodiments of the present disclosure.

FIG. 5 illustrates an example in which a memory system 100 divides a plurality of memory dies DIE into a plurality of memory die groups according to embodiments of the present disclosure.

The memory controller 120 of the memory system 100 may group and manage some of the plurality of memory dies included in the memory device 110 into a first memory die group DGRP_1 and a second memory die group DGRP_2.

In FIG. 5, the first memory die group DGRP_1 may include M (M is a natural number) memory dies DIE11 to DIE1M, and the second memory die group DGRP_2 may include N (N is a natural number) memory dies DIE21 to DIE2N.

If M is 2, the configuration of the first memory die group DGRP_1 may be a double die package (DDP). If N is 4, the configuration of the second memory die group DGRP_2 may be a quad die package (QDP).

In an embodiment, the values of M and N may be the same. That is, the memory controller 120 may set the first memory die group DGRP_1 and the second memory die group DGRP_2 so that the number of memory dies included in the first memory die group DGRP_1 is the same as the number of memory dies included in the second memory die group DGRP_2.

In embodiments of the present disclosure, the memory controller 120 may independently manage each memory die group, or may integrate and manage different memory die groups. Hereinafter, a specific embodiment in which the memory controller 120 manages memory die groups will be described.

First, the memory controller 120 may set a super memory block for any memory die group of a plurality of memory die groups.

A super memory block for a memory die group is a set of memory blocks including some of the memory blocks included in the memory die group. The memory controller 120 may perform a read, write, or erase operation in units of a super memory block.

The memory controller 120 may replace a bad memory block which cannot normally store data from among the memory blocks included in the super memory block with a normal memory block which can normally read and write data. In this case, the bad memory block may be a manufactured bad memory block (MBB) generated during manufacture of the memory device 110, or a runtime bad memory block (RBB) generated while using the memory device 110.

Figure 6:
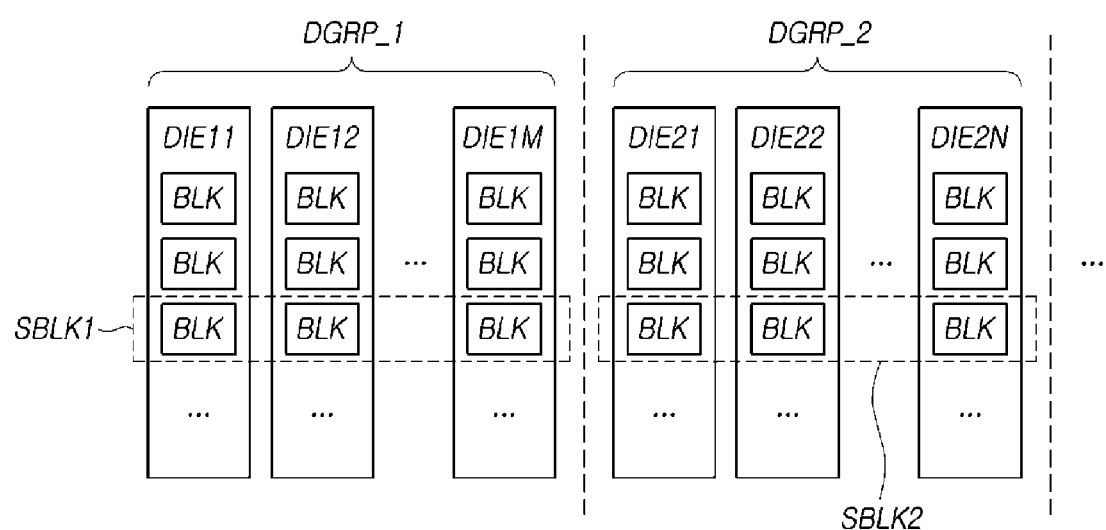
FIG. 6 illustrates an example of a first super memory block and a second super memory block according to embodiments of the present disclosure.

FIG. 6 illustrates an example of a first super memory block SBLK1 and a second super memory block SBLK2 according to embodiments of the present disclosure.

Referring to FIG. 6, a memory controller 120 of the memory system 100 may set a first super memory block SBLK1 which is a super memory block including at least one of the memory blocks BLK included in the memory dies DIE11 to DIE1M included in the first memory die group DGRP_1.

In addition, the memory controller 120 may set a second super memory block SBLK2 which is a super memory block including at least one of the memory blocks BLK included in the memory dies DIE21 to DIE2N included in the second memory die group DGRP_2 included in the grouped memory dies.

In embodiments of the present disclosure, the memory controller 120 of the memory system 100 may determine whether to set one extended super memory block by merging the first super memory block SBLK1 and the second super memory block SBLK2.

Figure 7:
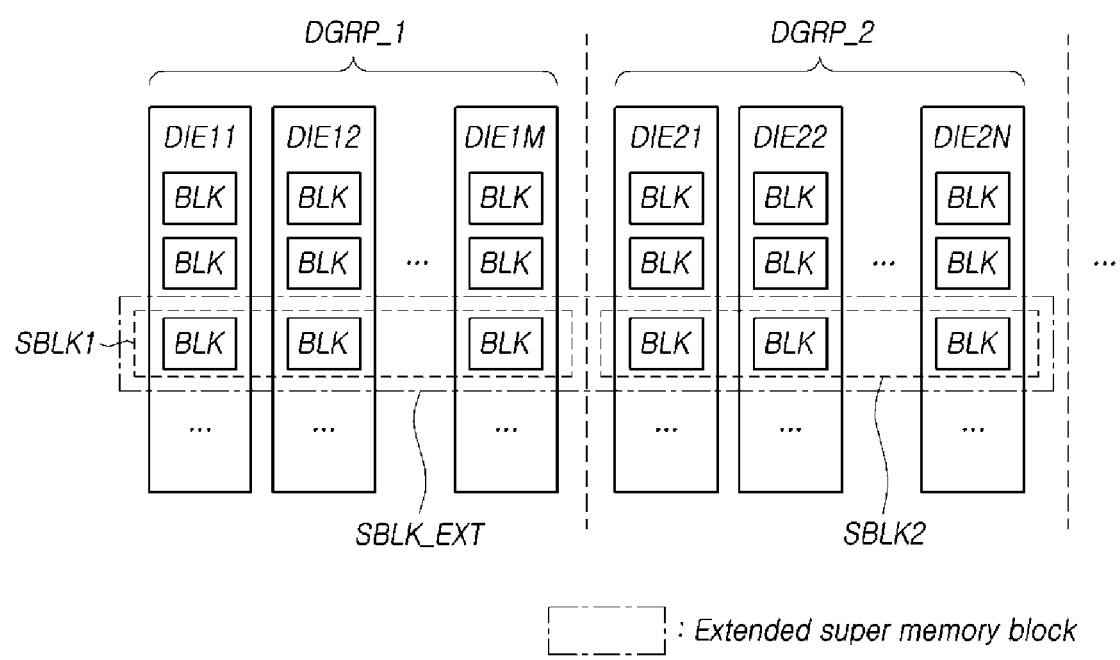
FIG. 7 illustrates an example of an extended super memory block according to embodiments of the present disclosure.

FIG. 7 illustrates an example of an extended super memory block SBLK_EXT according to embodiments of the present disclosure.

In FIG. 7, a memory controller 120 of the memory system 100 may set an extended super memory block SBLK_EXT in which all or part of memory blocks of the first super memory block SBLK1 and all or part of memory blocks of the second super memory block SBLK2 are merged.

In FIG. 7, the extended super memory block SBLK_EXT includes all memory blocks of the first super memory block SBLK1 and all memory blocks of the second super memory block SBLK2. However, the memory controller 120 may set the extended super memory block SBLK_EXT by merging all memory blocks of the first super memory block SBLK1 and a part of memory blocks of the second super memory block SBLK2, or by merging a part of memory blocks of the first super memory block SBLK1 and all memory blocks of the second super memory block SBLK2, or by merging a part of memory blocks of the first super memory block SBLK1 and a part of memory blocks of the second super memory block SBLK2.

For example, the first super memory block SBLK1 includes four memory blocks BLK and the second super memory block SBLK2 includes four memory blocks BLK. In this case, the extended super memory block SBLK_EXT may include, for example, a total of eight memory blocks BLK, which is the sum of the four memory blocks BLK included in the first super memory block SBLK1 and the four memory blocks BLK included in the second super memory block SBLK2. As another example, the extended super memory block SBLK_EXT may include a total of six memory blocks BLK, which is the sum of the four memory blocks BLK included in the first super memory block SBLK1 and two memory blocks BLK among the four memory blocks BLK included in the second super memory block SBLK2. As another example, the extended super memory block SBLK_EXT may include a total of six memory blocks BLK, which is the sum of two memory blocks BLK among four memory blocks BLK included in the first super memory block SBLK1 and the four memory blocks BLK included in the second super memory block SBLK2. As another example, the extended super memory block SBLK_EXT may include a total of four memory blocks BLK, which is the sum of two memory blocks BLK among the four memory blocks BLK included in the first super memory block SBLK1 and two memory blocks BLK among the four memory blocks BLK included in the second super memory block SBLK2.

The memory controller 120 of the memory system 100 may execute a read, write, or erase operation in units of an extended super memory block SBLK_EXT. Hereinafter, an operation in which the memory controller 120 of the memory system 100 writes data into the extended super memory block SBLK_EXT in FIG. 8, will be described.

Figure 8:
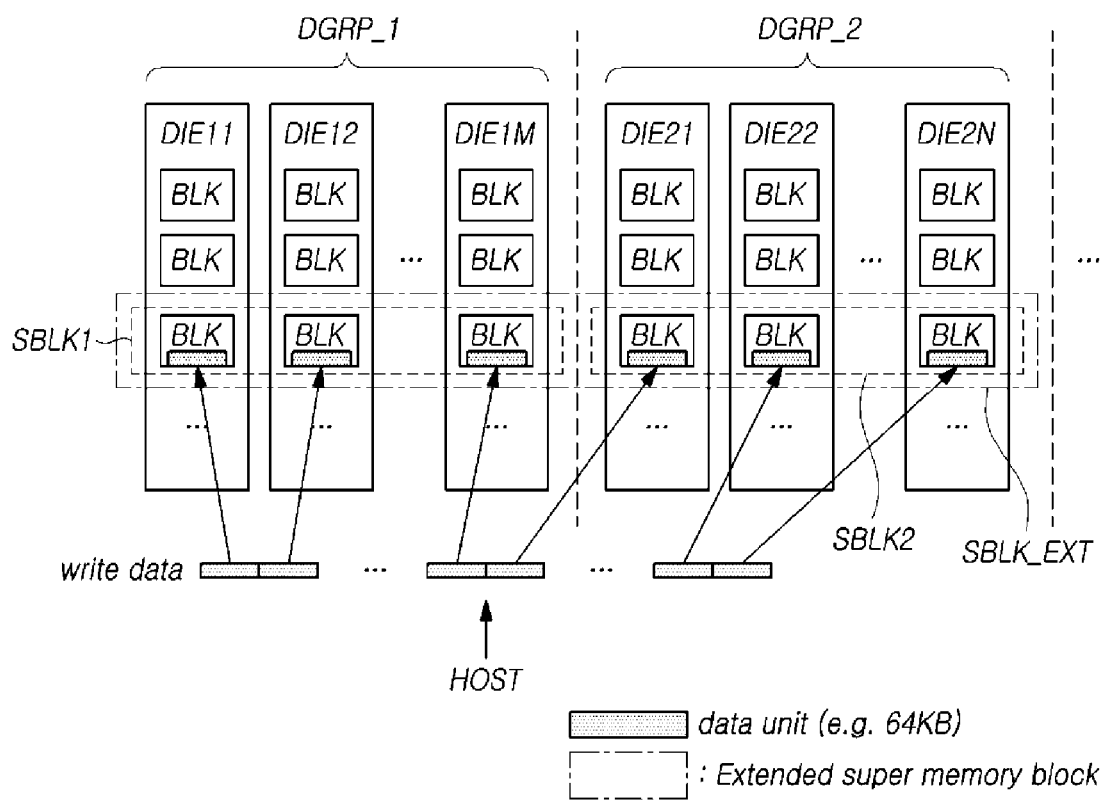
FIG. 8 illustrates an example of an operation of writing data to an extended super memory block by a memory system according to embodiments of the present disclosure.

FIG. 8 illustrates an example of an operation of writing data to an extended super memory block by a memory system 100 according to embodiments of the present disclosure.

Referring to FIG. 8, when writing the write data requested by a host to the extended super memory block SBLK_EXT, the memory controller 120 of the memory system 100 may write the write data to the extended super memory block SBLK_EXT in an interleaving manner.

Writing data into the extended super memory block SBLK_EXT in the interleaving manner by the memory controller 120 means that the memory controller divides the data, and then writes the divided data at the same time to each memory block included in the extended super memory block SBLK_EXT. That is, time intervals in which divided data is written to different memory blocks included in the extended super memory block SBLK_EXT may overlap with each other.

For example, a channel corresponding to each of the plurality of memory dies DIE may be shared by two or more ways. The memory controller 120 may write the divided data to the extended super memory block SBLK_EXT in the interleaving manner by performing a data write operation through the ways sharing one channel.

In FIG. 8, the memory controller 120 may divide data to be written into data units of a preset size (e.g., 64 KB), and may simultaneously write each data unit to a memory block included in the extended super memory block SBLK_EXT.

As described above, the memory controller 120 sets the extended super memory block SBLK_EXT, if necessary, and then writes the write data in the interleaving manner, thereby increasing the size of the data to be written to the memory device 110 per unit time. On the other hand, in a general case, the memory controller 120 sets the super memory block only in the memory die group, thereby saving resources required for writing data (e.g., a write cache buffer temporarily storing write data). That is, the memory controller 120 may optimize write performance according to a pattern of write data received from a host.

In the above, a method of setting the first super memory block SBLK1, the second super memory block SBLK2, and the extended super memory block SBLK_EXT by the memory system 100 has been described.

Hereinafter, a specific embodiment in which the memory system 100 sets the first super memory block SBLK1 and the second super memory block SBLK2d will be described.

Figure 9:
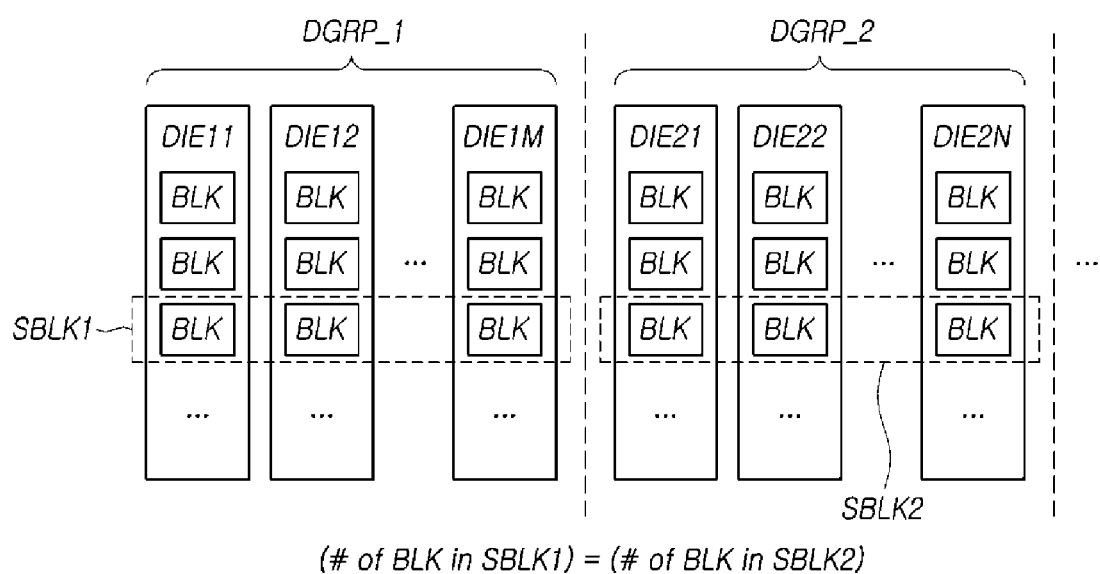
FIG. 9 illustrates an example of the number of memory blocks included in a first super memory block and a second super memory block according to embodiments of the present disclosure.

FIG. 9 illustrates an example of the number of memory blocks included in a first super memory block SBLK1 and a second super memory block SBLK2 according to embodiments of the present disclosure.

Referring to FIG. 9, the memory controller 120 of the memory system 100 may set a first super memory blocks SBLK1 and a second super memory blocks SBLK2 so that the number of memory blocks BLK included in the first super memory block SBLK1 is same as the number of the memory blocks BLK included in the second super memory block SBLK2. For example, if the number of memory blocks BLK included in the first super memory block SBLK1 is 4, the number of memory blocks BLK included in the second super memory block SBLK2 may also be 4.

Figure 10:
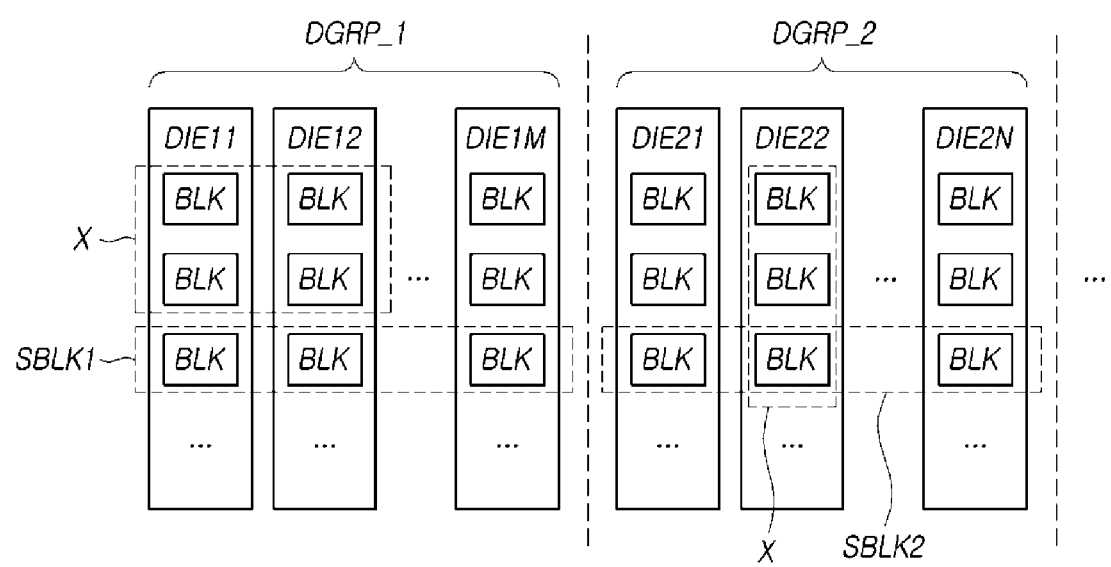
FIG. 10 illustrates an example of a method of setting a first super memory block and a second super memory block by a memory system according to embodiments of the present disclosure.

FIG. 10 illustrates an example of a method of setting a first super memory block SBLK1 and a second super memory block SBLK2 by a memory system according to embodiments of the present disclosure.

Referring to FIG. 10, the memory blocks BLK included in the first super memory block SBLK1 are included in different memory dies of the first memory die group DGRP_1, respectively. That is, the memory controller 120 may set a super memory block by the memory blocks selected from different memory dies within the memory die group.

For example, the memory controller 120 may set the first super memory block SBLK1 by selecting one memory block for each of the memory dies DIE11 to DIE1M included in the first memory die group DGRP_1.

On the other hand, in order to ensure that two memory blocks inoperable in an interleaved manner are not included in the same super memory block, the memory controller 120 may set the super memory block so that two memory blocks are not selected from the same memory die DIE11 among the memory dies DIE11 to DIE1M included in the first memory die group DGRP_1, or may set the super memory block so that two memory blocks are not selected from the same memory die DIE12.

Similarly, each of the memory blocks BLK included in the second super memory block SBLK2 is included in different memory dies of the second memory die group DGRP_2, respectively.

For example, the memory controller 120 may set the second super memory block SBLK2 by memory blocks selected from the respective memory dies DIE21 to DIE2N included in the second memory die group DGRP_2.

On the other hand, the memory controller 120 may not set the super memory block only with the memory blocks included in the same memory die DIE22 among the memory dies DIE21 to DIE2N included in the second memory die group DGRP_2.

Hereinafter, an embodiment of a method of determining whether to set the extended super memory block SBLK_EXT by the memory system 100 with reference to FIGS. 11 to 12, will be described.

Figure 11:
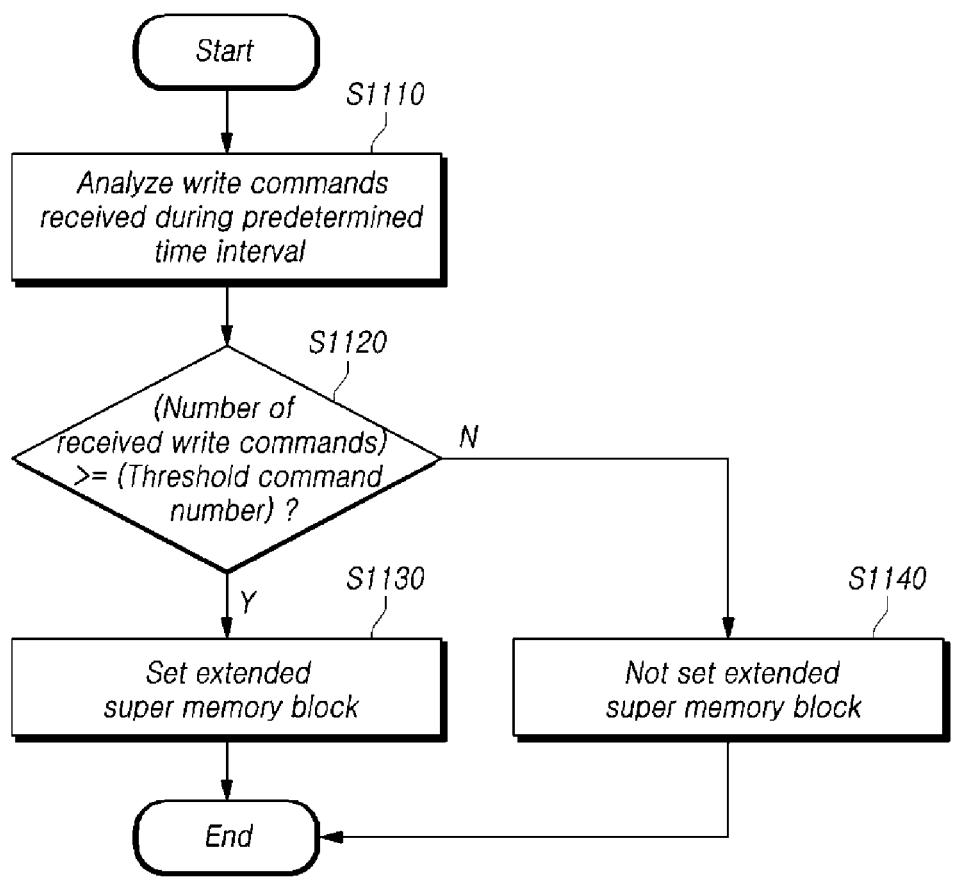
FIG. 11 illustrates an example of a method of determining whether to set an extended super memory block by a memory system according to embodiments of the present disclosure.

FIG. 11 illustrates an example of a method of determining whether to set an extended super memory block by a memory system 100 according to embodiments of the present disclosure.

Referring to FIG. 11, a memory controller 120 of the memory system 100 may analyze a number of write commands received during a predetermined time interval (S1110).

The memory controller 120 may determine whether the number of write commands received during a predetermined time interval is greater than or equal to the set threshold command number (S1120).

In the case that the number of write commands received during a predetermined time interval is greater than or equal to the set threshold command number (S1120—Y), the memory controller 120 may determine to set an extended super memory block (S1130). On the other hand, if the number of write commands received during a predetermined time interval is less than the set threshold command number (S1120—N), the memory controller 120 may determine not to set the extended super memory block (S1140).

Figure 12:
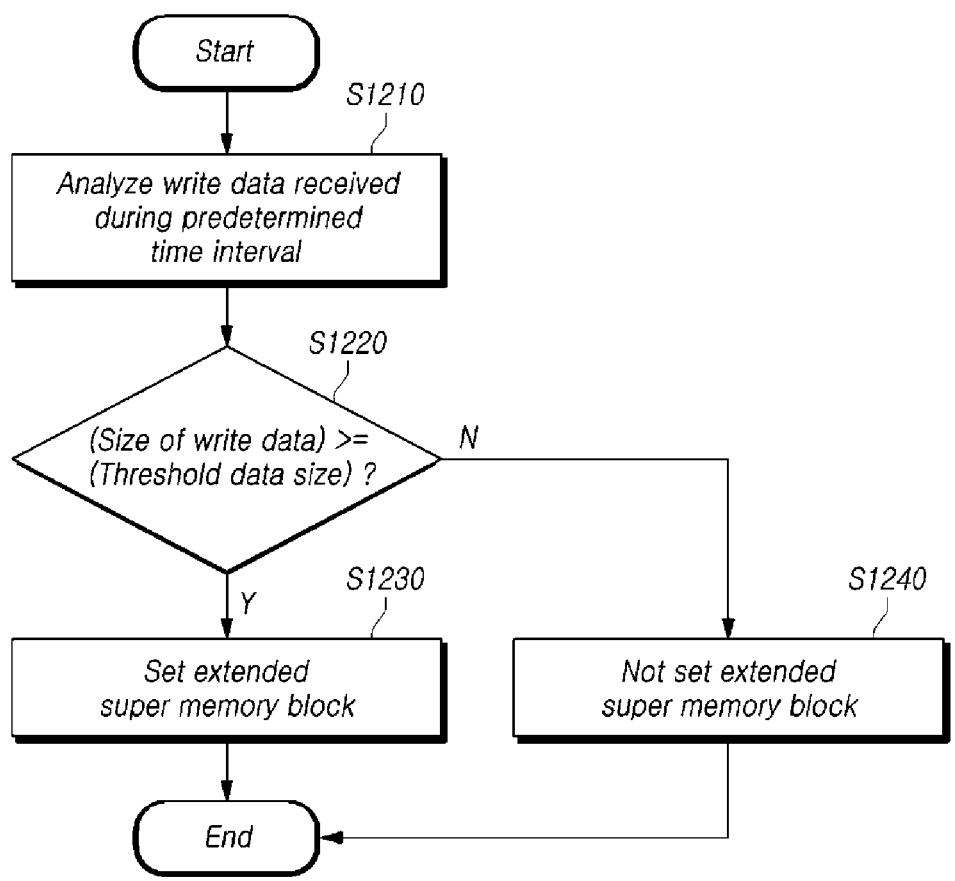
FIG. 12 illustrates another example of a method of determining whether to set an extended super memory block by a memory system according to embodiments of the present disclosure.

FIG. 12 illustrates another example of a method of determining whether to set an extended super memory block by a memory system 100 according to embodiments of the present disclosure.

Referring to FIG. 12, a memory controller 120 of the memory system 100 may analyze the write data received during a predetermined time interval (S1210).

The memory controller 120 may determine whether a size of the write data received during a predetermined time interval is greater than or equal to the set threshold data size (S1220).

When the size of the write data received during a predetermined time interval is greater than or equal to the set threshold data size (S1220—Y), the memory controller 120 may determine to set the extended super memory block (S1230). On the other hand, if the size of the write data received during the predetermined time interval is less than the set threshold data size (S1220—N), the memory controller 120 may determine not to set the extended super memory block (S1240).

Figure 13:
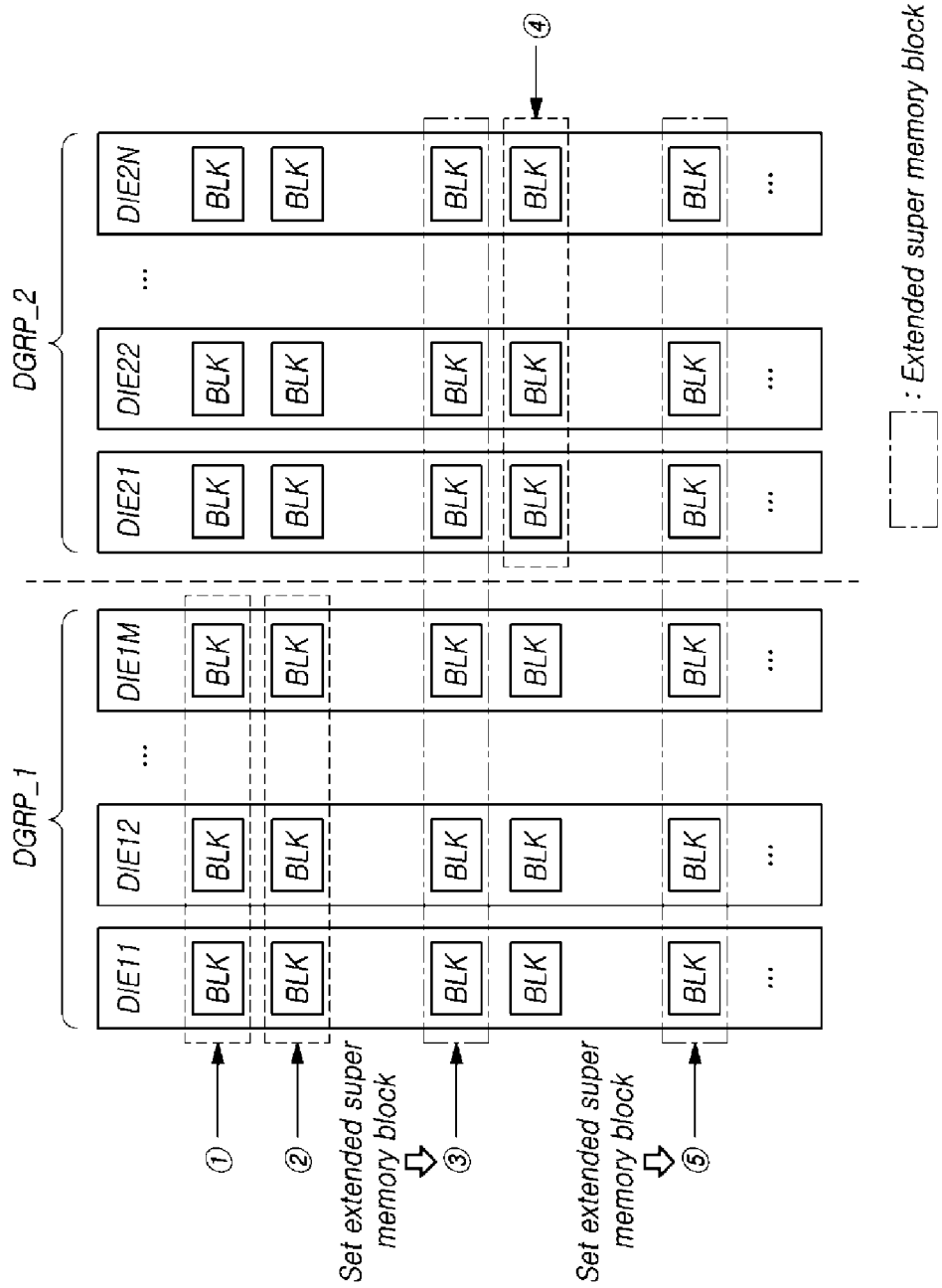
FIG. 13 illustrates an example of an operation of writing data to a super memory block by a memory system according to embodiments of the present disclosure.

FIG. 13 illustrates an example of an operation of writing data to a super memory block by a memory system 100 according to embodiments of the present disclosure.

Referring to FIG. 13, a memory controller 120 of the memory system 100 may first write data to the super memory block ① located in the first memory die group DGRP_1.

Thereafter, the memory controller 120 may write data to another super memory block ② located in the first memory die group DGRP_1.

Then, in the case that the memory controller 120 determines to set one extended super memory block by merging one super memory block located in the first memory die group DGRP_1 and one super memory block located in the second memory die group DGRP_2, the memory controller 120 may write data to the set extended super memory block ①.

Thereafter, when a specific condition is satisfied, the memory controller 120 may write data to one super memory block ⑭ located in the second memory die group DGRP_2 instead of the super memory block located in the first memory die group DGRP_1.

As an example, when the number of super memory blocks to which data can be written among the super memory blocks included in the first memory die group DGRP_1 is less than or equal to the set threshold number of super memory blocks, the memory controller 120 may write data to one super memory block ④ located in the second memory die group DGRP_2.

Then, when the memory controller 120 determines to set one extended super memory block by merging one super memory block located in the first memory die group DGRP_1 and one super memory block located in the second memory die group DGRP_2, the memory controller 120 may write data to the set extended super memory block ⑤.

Figure 14:
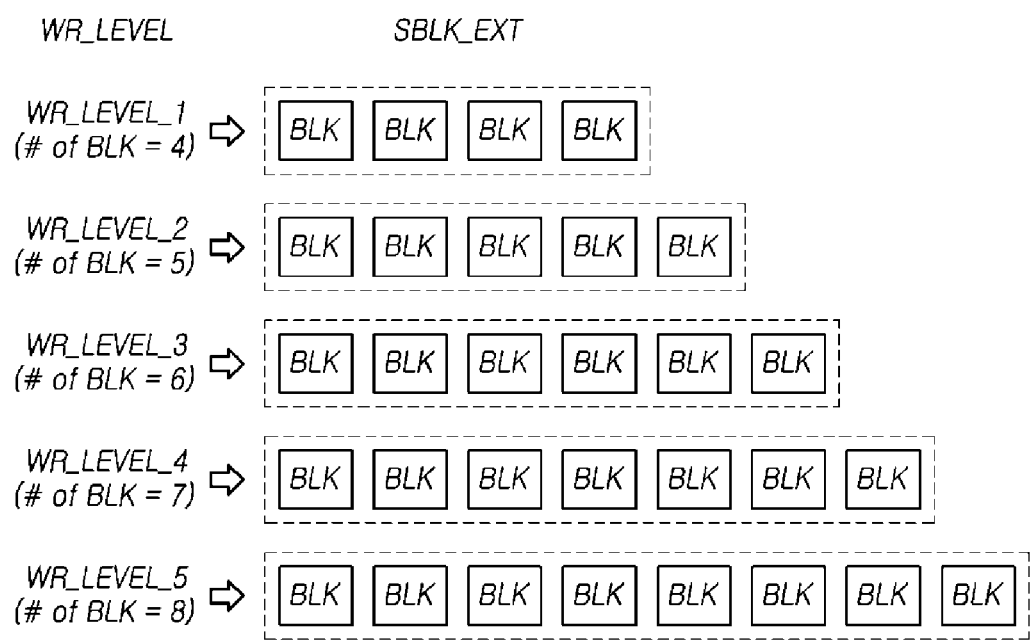
FIG. 14 illustrates an example of a method of setting the size of an extended super memory block by a memory system according to embodiments of the present disclosure.

FIG. 14 illustrates an example of a method of setting the size of an extended super memory block SBLK_EXT by a memory system 100 according to embodiments of the present disclosure.

Referring to FIG. 14, a memory controller 120 of the memory system 100 may set the number of memory blocks BLK included in the extended super memory block SBLK_EXT according to a write performance requirement level WR_LEVEL.

The write performance requirement level WR_LEVEL is a value for indicating write performance that the host requires to the memory system 100. If the write performance requirement level WR_LEVEL indicates high write performance, memory controller 120 of the memory system 100 is required to increase the size of data simultaneously written to the memory device 110 to satisfy high write performance. Accordingly, the memory controller 120 is required to increase the number of memory blocks BLK included in the extended super memory block SBLK_EXT.

On the other hand, if the write performance requirement level WR_LEVEL indicates low write performance, the memory controller 120 of the memory system 100 may reduce the number of memory blocks BLK included in the extended super memory block SBLK_EXT within a range that satisfies low write performance.

In FIG. 14, if the write performance requirement level WR_LEVEL is the first write performance requirement level WR_LEVEL_1, the memory controller 120 may set the number of memory blocks to be included in the extended super memory block SBLK_EXT to four. If the write performance requirement level WR_LEVEL is the second write performance requirement level WR_LEVEL_2, the memory controller 120 may set the number of memory blocks to be included in the extended super memory block SBLK_EXT to five. If the write performance requirement level WR_LEVEL is the third write performance requirement level WR_LEVEL_3, the memory controller 120 may set the number of memory blocks to be included in the extended super memory block SBLK_EXT to six. If the write performance requirement level WR_LEVEL is the fourth write performance requirement level WR_LEVEL_4, the memory controller 120 may set the number of memory blocks to be included in the extended super memory block SBLK_EXT to seven. If the write performance requirement level WR_LEVEL is the fifth write performance requirement level WR_LEVEL_5, the memory controller 120 may set the number of memory blocks to be included in the extended super memory block SBLK_EXT to eight.

In FIG. 14, an example, in which the number of write performance requirement levels WR_LEVEL is 5 and the number of memory blocks included in the extended super memory block SBLK_EXT is between 4 and 8 has been described. The number of write performance requirement levels WR_LEVEL and specific values of the number of memory blocks included in the extended super memory block SBLK_EXT corresponding to each write performance requirement level WR_LEVEL may be determined differently.

Hereinafter, a specific embodiment of determining the write performance requirement level WR_LEVEL described in FIG. 14 with reference to FIGS. 15 to 16 will be described.

Figure 15:
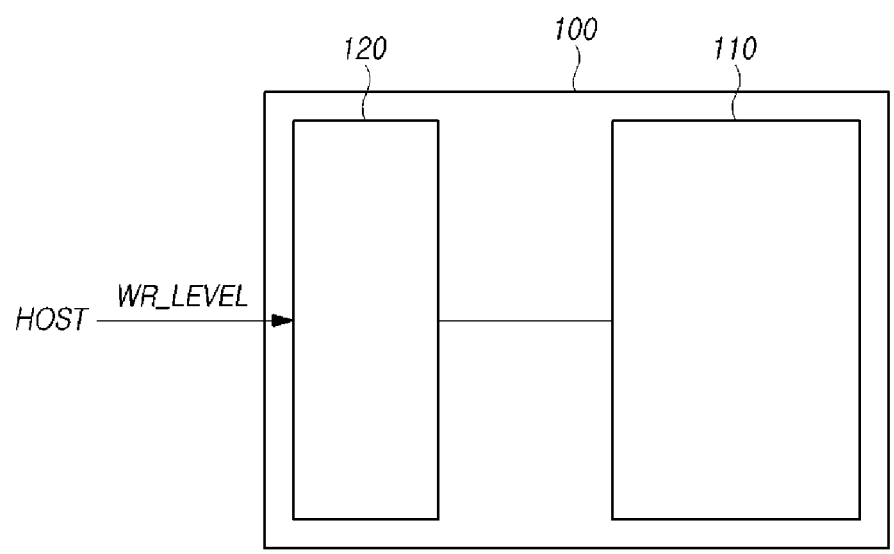
FIG. 15 illustrates an example of a method of determining a write performance requirement level according to embodiments of the present disclosure.

FIG. 15 illustrates an example of a method of determining a write performance requirement level WR_LEVEL according to embodiments of the present disclosure.

Referring to FIG. 15, a memory controller 120 of the memory system 100 may receive a write performance requirement level WR_LEVEL from a host HOST. That is, the host HOST determines the write performance requirement level WR_LEVEL.

The memory controller 120 may receive the write performance requirement level WR_LEVEL from the host through a command or signal including information on the write performance requirement level WR_LEVEL.

Figure 16:
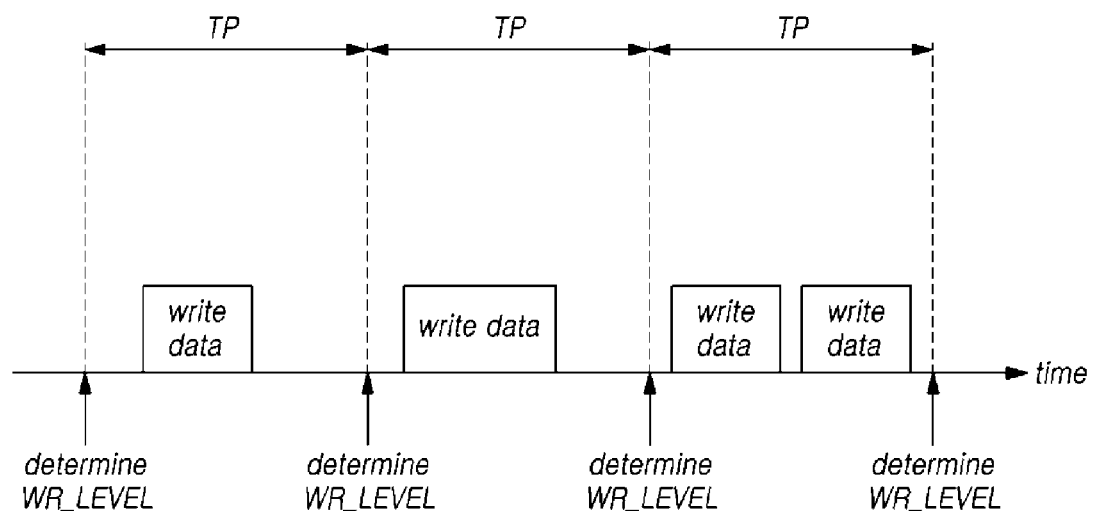
FIG. 16 illustrates another example of a method of determining a write performance requirement level according to embodiments of the present disclosure.

FIG. 16 illustrates another example of a method of determining a write performance requirement level WR_LEVEL according to embodiments of the present disclosure.

Referring to FIG. 16, a memory controller 120 of the memory system 100 may determine a write performance requirement level WR_LEVEL based on a size of write data measured every set time period TP. That is, the memory controller 120 determines the write performance requirement level WR_LEVEL.

The memory controller 120 may measure the size of the write data received from a host HOST during the time period TP and determine the write performance requirement level WR_LEVEL according to the measured size of the write data.

For example, if the size of the measured write data is large, the memory controller 120 may determine that the host HOST requires high write performance, and may increase the write performance requirement level WR_LEVEL. In this case, the memory controller 120 may increase the number of memory blocks to be included in one extended super memory block.

On the other hand, if the size of the measured write data is small, the memory controller 120 may determine that the host HOST requires low write performance, thereby lowering the write performance requirement level WR_LEVEL. In this case, the memory controller 120 may reduce the number of memory blocks to be included in one extended super memory block.

In the above, a method in which the memory system 100 groups a plurality of memory dies included in the memory device 110 into two or more memory die groups and sets the extended super memory block by merging the super memory blocks set in different memory die groups has been described.

Hereinafter, a method in which a memory system 100 sets an extended super memory block by merging different super memory blocks without performing an operation of grouping a plurality of memory dies included in the memory device 110 will be described.

Figure 17:
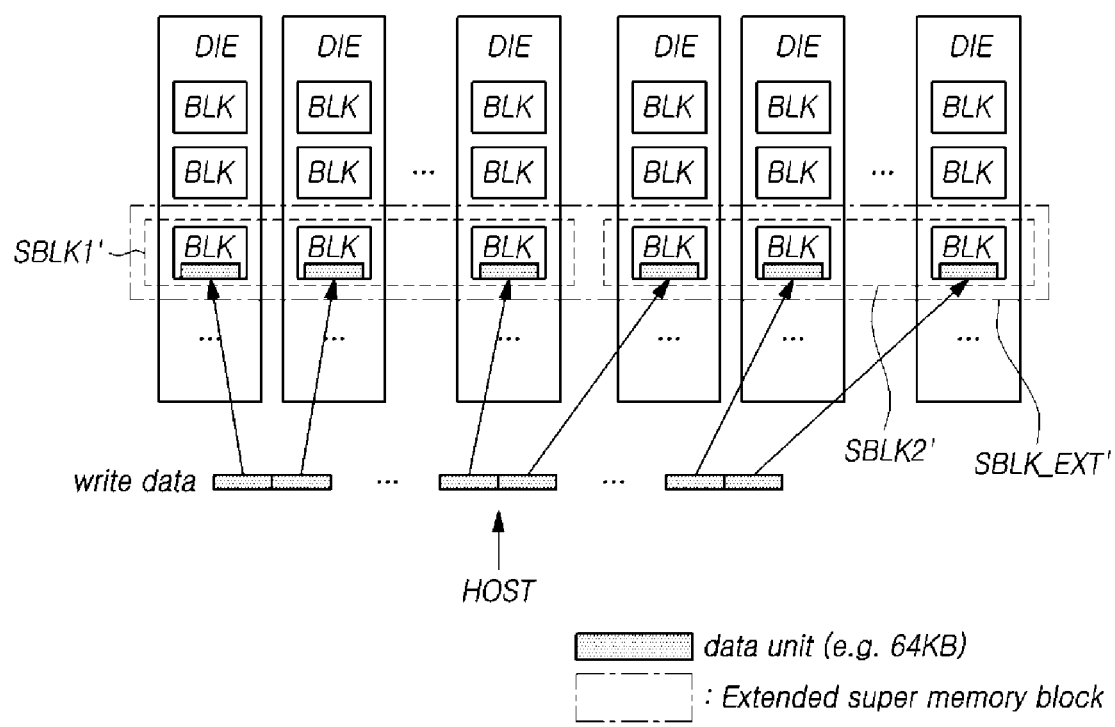
FIG. 17 illustrates another example of setting an extended super memory block by a memory system according to embodiments of the present disclosure.

FIG. 17 illustrates another example of setting an extended super memory block by a memory system 100 according to embodiments of the present disclosure.

Referring to FIG. 17, a memory controller 120 of the memory system 100 may set a first super memory block SBLK1' and a second super memory block SBLK2', which are two super memory blocks each including at least one of the memory blocks BLK included in the plurality of memory dies DIE included in the memory device 110. In this case, the memory blocks included in the first super memory block SBLK1' and the memory blocks included in the second super memory block SBLK2' may be located on different memory dies or may be located on the same memory die.

In addition, the memory controller 120 may determine whether to set an extended super memory block SBLK_EXT' in which all or part of memory blocks of the first super memory block SBLK1' and all or part of memory blocks of the second super memory block SBLK2' are merged.

Furthermore, when writing the write data requested by the host HOST to the extended super memory block SBLK_EXT', the memory controller 120 may write the write data to the extended super memory block SBLK_EXT' according to the interleaving manner described with reference to FIG. 8.

Figure 18:
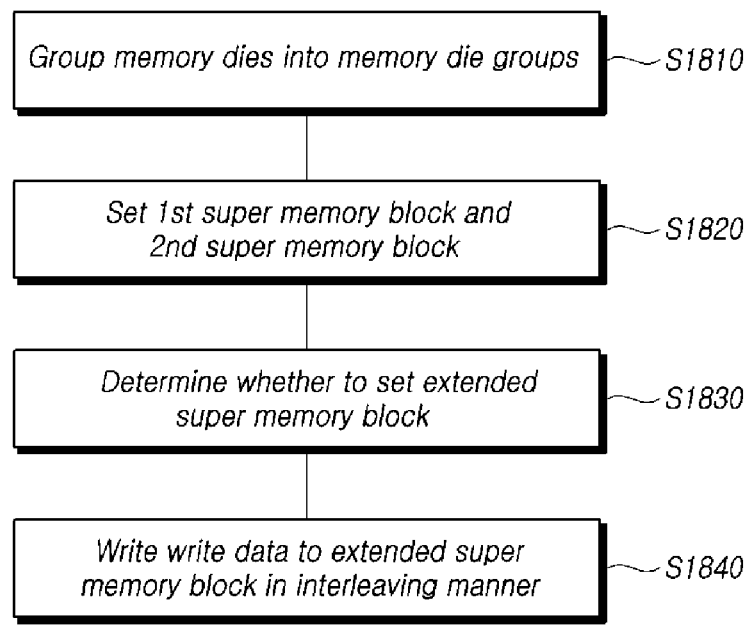
FIG. 18 illustrates an operating method of a memory system according to embodiments of the present disclosure.

FIG. 18 illustrates an operating method of a memory system 100 according to embodiments of the present disclosure.

Referring to FIG. 18, an operating method of the memory system 100 may include grouping a plurality of memory dies included in the memory device 110 into a plurality of memory die groups (S1810).

In addition, the operating method of the memory system 100 may include setting a first super memory block SBLK1 and the second super memory block SBLK2 (S1820). The first super memory block SBLK1 is a super memory block including at least two of memory blocks included in memory dies included in a first memory die group DGRP_1 among the plurality of memory die groups. In addition, the second super memory block SBLK2 is a super memory block including at least two of the memory blocks included in the second memory die group DGRP_2 among the plurality of memory die groups.

In this case, the number of memory dies included in the first memory die group DGRP_1 may be the same as the number of memory dies included in the second memory die group DGRP_2.

The number of memory blocks included in the first super memory block SBLK1 may be the same as the number of memory blocks included in the second super memory block SBLK2.

The memory blocks included in the first super memory block SBLK1 and the memory blocks included in the second super memory block SBLK2 may be included in different memory dies.

In addition, the operating method of the memory system 100 may include determining whether to set an extended super memory block SBLK_EXT in which all or part of memory blocks of the first super memory block SBLK1 set in operation S1820 and all or part of memory blocks of the second super memory block SBLK2 are merged (S1830).

For example, in operation S1830, the memory system 100 may determine to set the extended super memory block SBLK_EXT when the number of write commands received from a host during a predetermined time interval is greater than or equal to the set threshold command number.

As another example, in operation S1830, the memory system 100 may determine to set the extended super memory block SBLK_EXT when the size of the write data received from the host for a predetermined time interval is greater than or equal to the set threshold data size.

In addition, the operating method of the memory system 100 may include, when writing the write data requested by the host to the extended super memory block SBLK_EXT set in operation S1830, writing the write data in an interleaving manner into the extended super memory block SBLK_EXT (S1840).

Furthermore, the number of memory blocks included in the extended super memory block SBLK_EXT may be determined according to a write performance requirement level.

In this case, the write performance requirement level may be received from the host, for example. As another example, the write performance requirement level may be determined based on the size of the write data measured at each time period.

Figure 19:
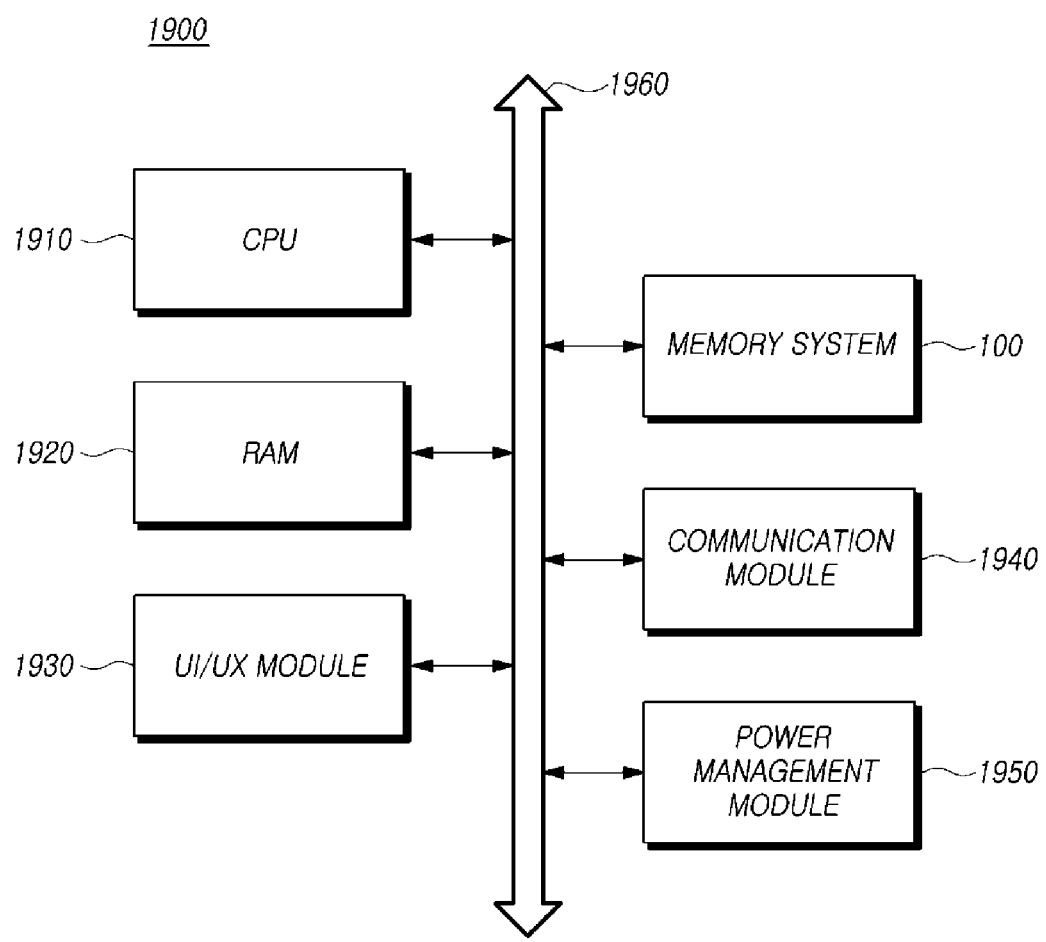
FIG. 19 is a diagram illustrating the configuration of a computing system based on some embodiments of the disclosed technology.

FIG. 19 is a diagram illustrating the configuration of a computing system 1900 based on an embodiment of the disclosed technology.

Referring to FIG. 19, the computing system 1900 based on an embodiment of the disclosed technology may include: a memory system 100 electrically connected to a system bus 1960; a CPU 1910 configured to control the overall operation of the computing system 1900; a RAM 1920 configured to store data and information related to operations of the computing system 1900; a user interface/user experience (UI/UX) module 1930 configured to provide is the user with a user environment; a communication module 1940 configured to communicate with an external device as a wired and/or wireless type; and a power management module 1950 configured to manage power used by the computing system 1900.

The computing system 1900 may be a personal computer (PC) or may include a mobile terminal such as a smartphone, a tablet or various electronic devices.

The computing system 1900 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure and the following claims. Furthermore, the embodiments may be combined to form additional embodiments.

What is claimed is:

1. A memory system comprising:
   a memory device comprising a plurality of memory dies, each memory die including a plurality of memory blocks; and
   a memory controller which communicates with the memory device and controls the memory device,
   wherein the memory controller is configured to:
   divide and manage the plurality of memory dies into a plurality of memory die groups,
   set a first super memory block which is a super memory block including at least one of memory blocks included in memory dies included in a first memory die group among the plurality of memory die groups, and a second super memory block which is a super memory block including at least one of memory blocks included in memory dies included in a second memory die group among the plurality of memory die groups, determine whether to set an extended super memory block in which all or part of the memory blocks of the first super memory block and all or part or the memory blocks of the second super memory block are merged, and write a write data to the extended super memory block in an interleaving manner when writing the write data requested by a host to the extended super memory block.

2. The memory system of claim 1, wherein the memory controller sets the first super memory block and the second super memory block so that each of memory blocks included in the first super memory block and memory blocks included in the second super memory block are included in different memory dies.

3. The memory system of claim 1, wherein the memory controller determines to set the extended super memory block when a number of write commands received from the host during a predetermined time interval is greater than or equal to a set threshold command number.

4. The memory system of claim 1, wherein the memory controller determines to set the extended super memory block when a size of write data received from the host during a predetermined time interval is greater than or equal to a set threshold data size.

5. The memory system of claim 1, wherein the memory controller is further configured to determine a number of memory blocks to be included in the extended super memory block according to a write performance requirement level.

6. The memory system of claim 5, wherein the memory controller is further configured to receive the write performance requirement level from the host.

7. The memory system of claim 5, wherein memory controller is further configured to determine the write performance requirement level based on a size of the write data measured at a set time period.

8. An operating method of a memory system including a memory device including a plurality of memory dies, each memory die including a plurality of memory blocks, the operating method comprising:

grouping the plurality of memory dies into a plurality of memory die groups;

setting a first super memory block which is a super memory block including at least one of memory blocks included in memory dies included in a first memory die group among the plurality of memory die groups, and a second super memory block which is a super memory block including at least one of memory blocks included in memory dies included in a second memory die group among the plurality of memory die groups;

determining whether to set an extended super memory block in which all or part of the memory blocks of the first super memory block and all or part of the memory blocks of the second super memory block are merged; and writing a write data to the extended super memory block in an interleaving manner when writing the write data requested by a host to the extended super memory block.

9. The operating method of the memory system of claim 8, wherein each of memory blocks included in the first super memory block and memory blocks included in the second super memory block are included in different memory dies.

10. The operating method of the memory system of claim 8, wherein the determining comprises determining to set the extended super memory block when a number of write commands received from the host during a predetermined time interval is greater than or equal to a set threshold command number.

11. The operating method of the memory system of claim 8, wherein the determining comprises determining to set the extended super memory block when a size of write data received from the host during a predetermined time interval is greater than or equal to a set threshold data size.

12. The operating method of the memory system of claim 8, further comprising determining a number of memory blocks included in the extended super memory block according to a write performance requirement level.

13. The operating method of the memory system of claim 12, further comprising receiving the write performance requirement level from the host.

14. The operating method of the memory system of claim 12, further comprising determining the write performance requirement level based on a size of the write data measured at a set time period.

15. A memory system comprising:

a memory device comprising a plurality of memory dies, each memory die including a plurality of memory blocks; and a memory controller which communicates with the memory device and controls the memory device, wherein the memory controller is configured to:

set a first super memory block and a second super memory block, which are two super memory blocks each including one or more of memory blocks included in the plurality of memory dies, determine whether to set an extended super memory block in which all or part of the memory blocks of the first super memory block and all or part of the memory blocks of the second super memory block are merged, and write a write data to the extended super memory block in an interleaving manner when writing the write data requested by a host to the extended super memory block.

* * * * *